(12) United States Patent
Marion et al.

(10) Patent No.: US 9,060,017 B2
(45) Date of Patent: Jun. 16, 2015

(54) SYSTEM FOR DETECTING, ANALYZING, AND CONTROLLING INFILTRATION OF COMPUTER AND NETWORK SYSTEMS

(71) Applicant: LOGOS TECHNOLOGIES LLC, Fairfax, VA (US)

(72) Inventors: John Marion, Annandale, VA (US); George Chamales, Oakland, CA (US)

(73) Assignee: Logos Technologies LLC, Fairfax, VA (US)

( * ) Notice: Subject to any disclaimer, the term of this patent is extended or adjusted under 35 U.S.C. 154(b) by 0 days.

(21) Appl. No.: 14/362,265

(22) PCT Filed: Feb. 20, 2013

(86) PCT No.: PCT/US2013/026902
§ 371 (c)(1),
(2) Date: Jun. 2, 2014

(87) PCT Pub. No.: WO2013/172898
PCT Pub. Date: Nov. 21, 2013

(65) Prior Publication Data
US 2014/0298469 A1 Oct. 2, 2014

Related U.S. Application Data

(60) Provisional application No. 61/601,131, filed on Feb. 21, 2012, provisional application No. 61/601,217, filed on Feb. 21, 2012.

(51) Int. Cl.
*G06F 12/16* (2006.01)
*H04L 29/06* (2006.01)
*G06F 21/55* (2013.01)
(Continued)

(52) U.S. Cl.
CPC ............ *H04L 63/1416* (2013.01); *G06F 21/55* (2013.01); *H04L 63/1441* (2013.01)

(58) Field of Classification Search
None
See application file for complete search history.

(56) References Cited

U.S. PATENT DOCUMENTS

| 5,440,723 A | 8/1995 | Arnold et al. |
| 5,684,875 A | 11/1997 | Ellenberger |
| 5,892,903 A | 4/1999 | Klaus |

(Continued)

FOREIGN PATENT DOCUMENTS

WO    01-95202 A1    12/2001

OTHER PUBLICATIONS

"How to modify proxied conversations", Sep. 8, 2006—OWASP (4 pages); retrieved on Jan. 7, 2013 from www.owasp.org/index.php/How_to_modify_proxied_conversations.

(Continued)

*Primary Examiner* — Shin-Hon Chen
(74) *Attorney, Agent, or Firm* — Drinker Biddle & Reath LLP

(57) ABSTRACT

A method for detecting and manipulating a malicious actor/communication on a computer network or system. The method includes the steps of incorporating one or more synthetic vulnerabilities into the computer system at distinct locations, where each synthetic vulnerability presents an opportunity for exploitation by a malicious actor/communication, detecting an exploitation of one of the vulnerabilities by an actor, analyzing the actor to determine if the actor is a malicious actor/communication; and manipulating the malicious actor/communication. A computer program on a storage medium is also disclosed.

28 Claims, 8 Drawing Sheets

(51) Int. Cl.
*G06F 12/14* (2006.01)
*G06F 11/00* (2006.01)

(56) References Cited

U.S. PATENT DOCUMENTS

| | | | |
|---|---|---|---|
| 7,042,852 B2* | 5/2006 | Hrastar | 370/310 |
| 7,412,723 B2 | 8/2008 | Blake et al. | |
| 8,056,136 B1 | 11/2011 | Zaitsev | |
| 2004/0128529 A1* | 7/2004 | Blake et al. | 713/200 |
| 2006/0018466 A1* | 1/2006 | Adelstein et al. | 380/46 |
| 2006/0161982 A1* | 7/2006 | Chari et al. | 726/23 |
| 2007/0079376 A1 | 4/2007 | Robert et al. | |
| 2008/0010225 A1* | 1/2008 | Gonsalves et al. | 706/11 |
| 2008/0028464 A1* | 1/2008 | Bringle et al. | 726/22 |
| 2009/0089878 A1 | 4/2009 | Monastyrsky et al. | |
| 2010/0031093 A1* | 2/2010 | Sun et al. | 714/45 |
| 2011/0219450 A1 | 9/2011 | McDougal et al. | |
| 2012/0084860 A1* | 4/2012 | Cao et al. | 726/23 |

OTHER PUBLICATIONS

"AppSensor Project", Jan. 18, 2012—OWASP (2 pages); retrieved on Jan. 7, 2013 from www.owasp.org/index.php/Cagegory:OWASP_AppSensor_Project.

"AppSensor DetectionPoints", Aug. 8, 2011—OWASP (32 pages); retrieved on Jan. 7, 2013 from www.owasp.org/index.php/AppSensor_DetectionPoints.

Baecher et al. "The Nepenthes Platform: An Efficient Approach to Collect Malware", pp. 165-184, (2006), University of Mannheim.

"The Honeynet Project", 2011/2012—Honeynet Project Blog (5 pages); retrieved on Jan. 7, 2013 from www.honeynet.org/aggregator.

"Spear Phishers", Apr. 1, 2009—FBI (1 page); retrieved on Jan. 7, 2013 from www.fbi.gov/news/stories/2009/april/spearphishing_040109.

"How to Use Network Behavior Analysis Tools", Nov. 10, 2008 (3 pages); retrieved on Jan. 7, 2013 from www.csoonline.com/article/print/458746.

Holz et al, "Detecting Honeypots and other suspicious environments". Proceedings of the 2005 IEEE Workshop on Information Assurance and Security, United States Military Academy, West Point, NY, Jun. 15-17, 2005 (08 pages).

Patent Examination Report No. 1 of the Australian Patent Office, Australian Patent Application No. 2013263373, Jul. 11, 2014 (12 pages).

"Security Monitoring and Attack Detection", Aug. 29, 2006 (24 pages); retrieved on Jul. 22, 2014 from http://technet.microsoft.com/en-us/library/cc875806(d=printer).aspx.

* cited by examiner

Fig. 2 - Inline Configuration
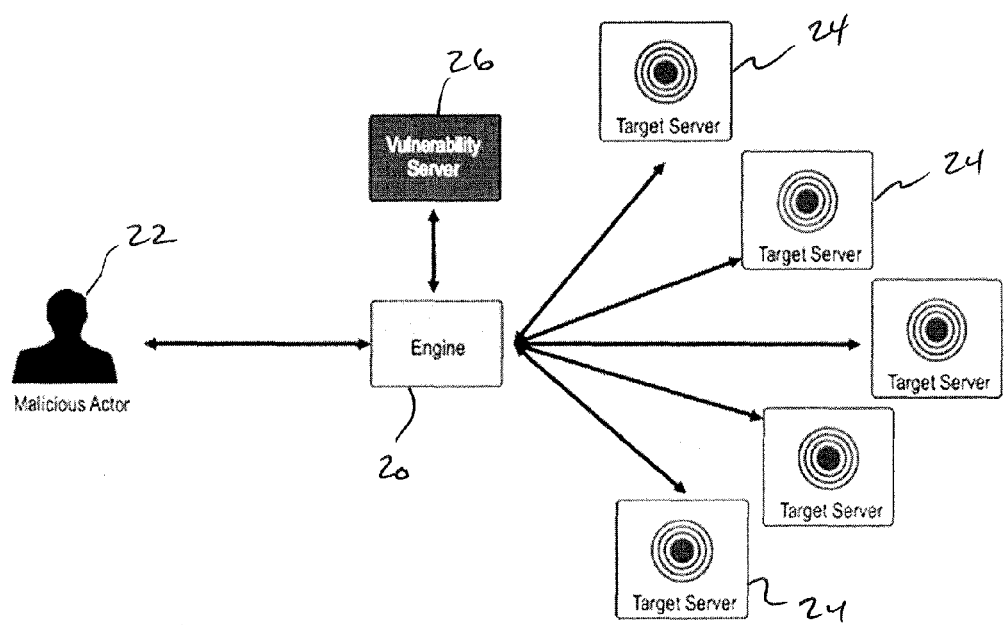

Fig. 3A: Out of Band Configuration
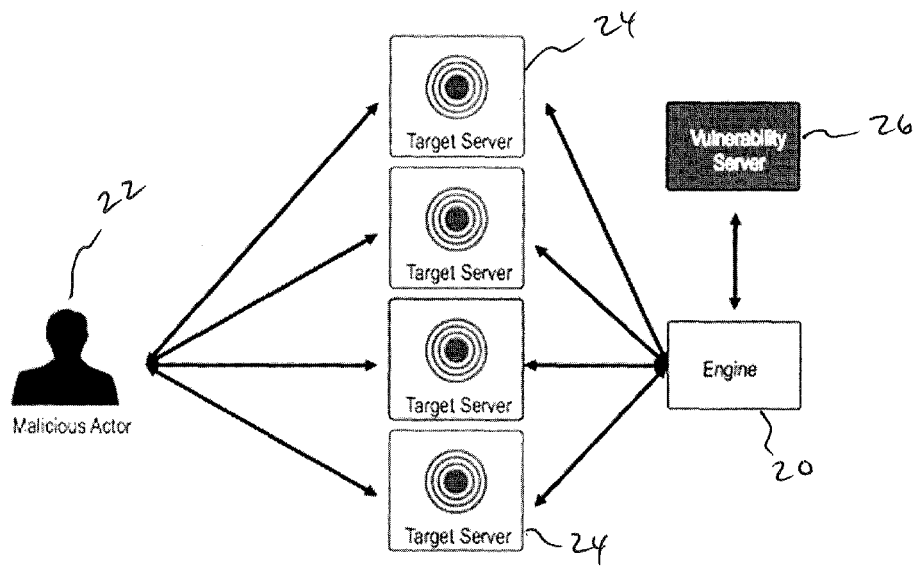
Fig. 3B
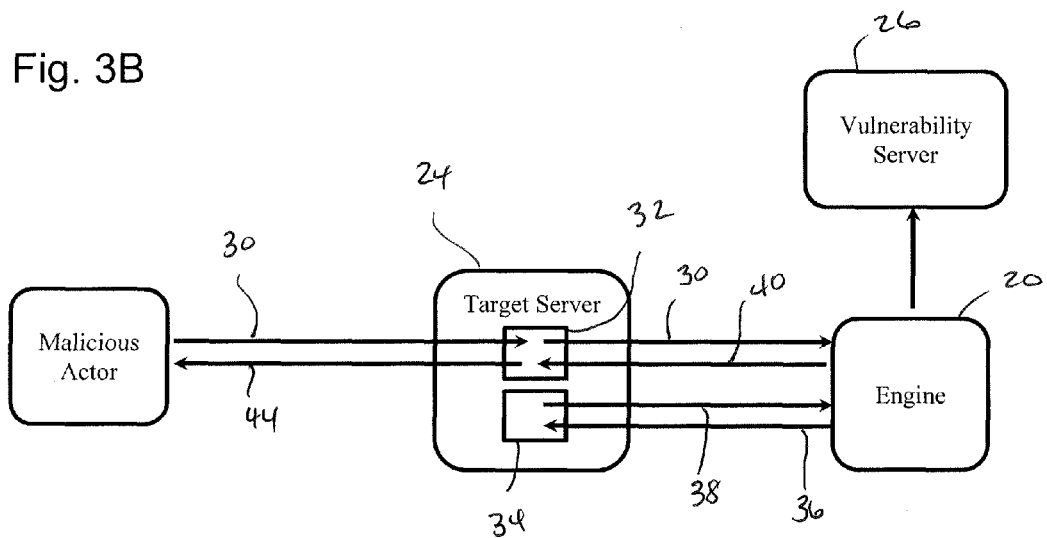

Fig. 4: On-Board Configuration
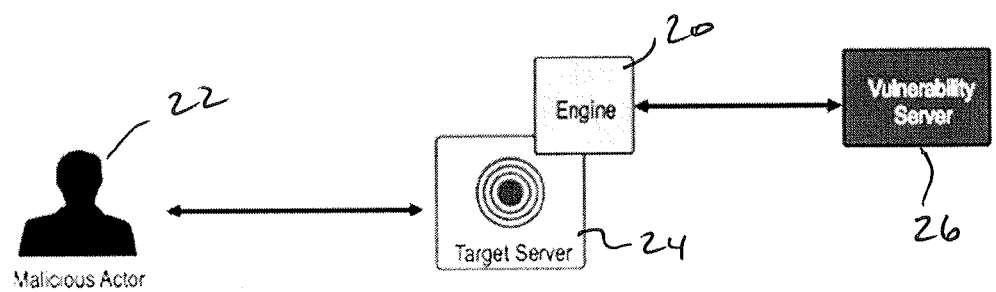

Fig. 5: Detection Point Taxonomy
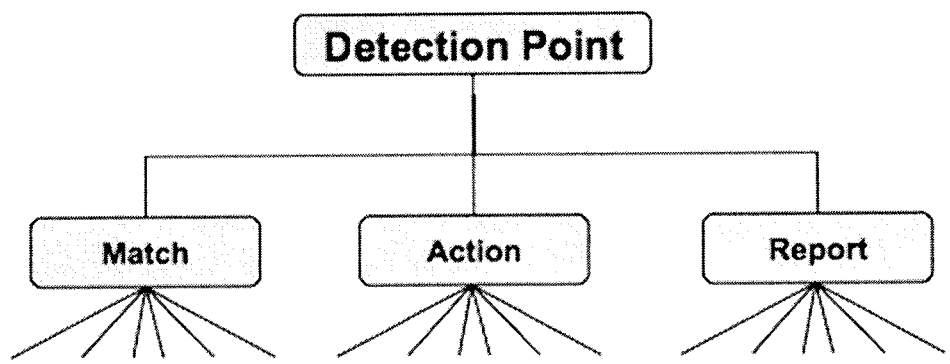

Fig. 6: Fabricated Mission
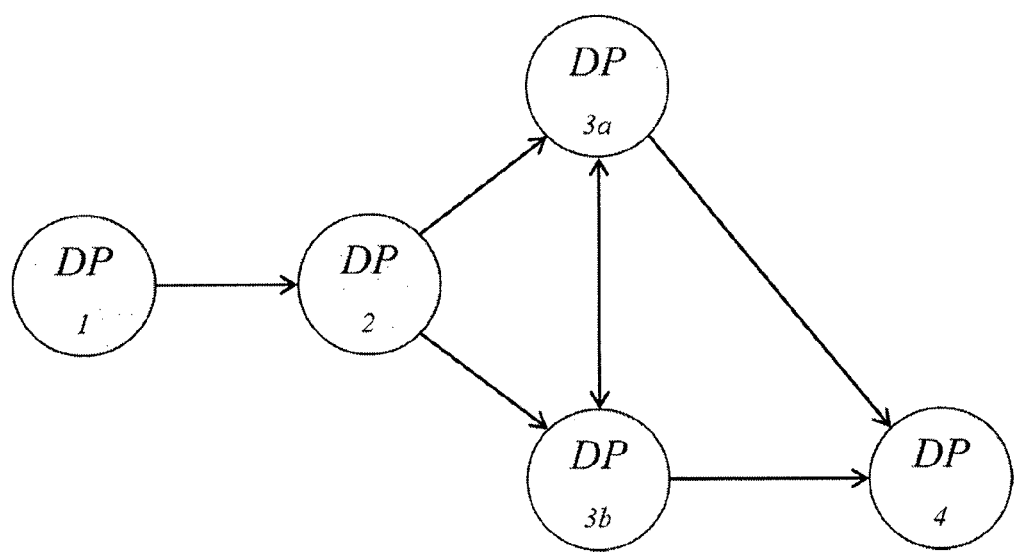

Fig. 7 - Characterization
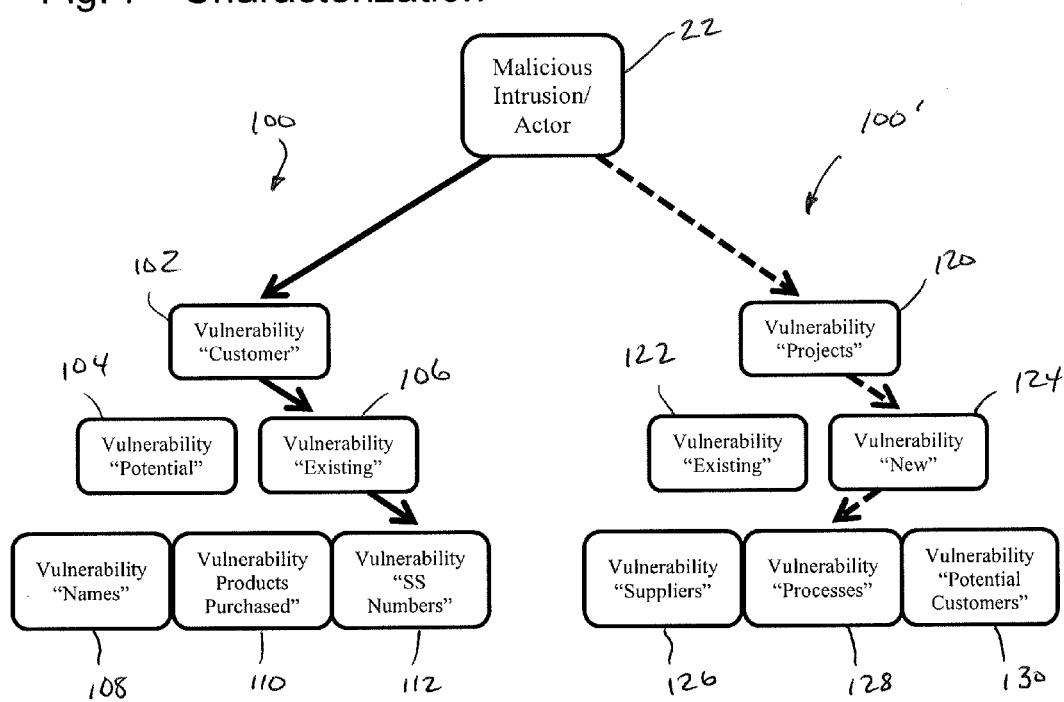

Fig. 8: Distributed Architecture
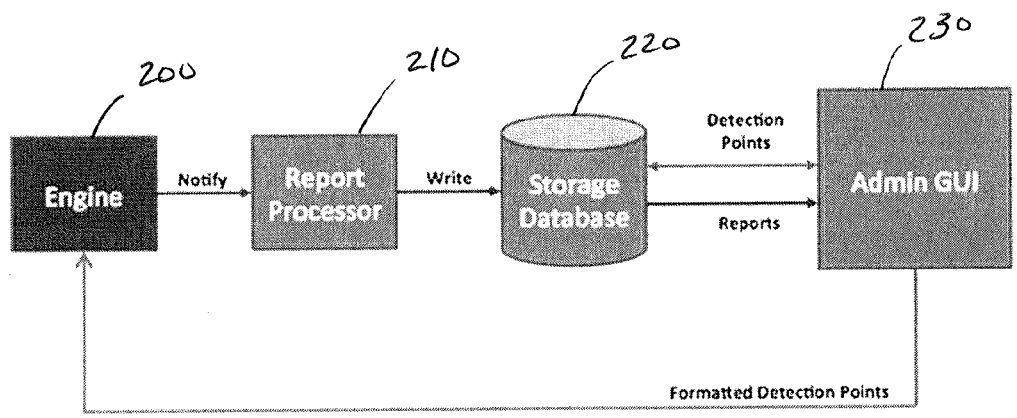

SYSTEM FOR DETECTING, ANALYZING, AND CONTROLLING INFILTRATION OF COMPUTER AND NETWORK SYSTEMS

CROSS REFERENCE TO RELATED APPLICATIONS

This application is an International Application of and claims priority to U.S. Provisional Patent Applications 61/601,217, filed on Feb. 21, 2012, entitled "WASP" and 61/601,131, filed on Feb. 21, 2012, entitled "WASP", which are hereby expressly incorporated by reference in their entirety.

STATEMENT OF GOVERNMENT INTEREST

The present invention was developed with funding from Contract No. FA8750-11-C-0172 awarded by Defense Advanced Research Projects Agency. The U.S. Government has certain rights in this invention.

FIELD OF THE INVENTION

The present invention relates generally to security of communication systems and, more particularly, to a system for the detection, manipulation, evaluation, intelligence gathering and prevention of unauthorized access to computer systems.

BACKGROUND OF THE INVENTION

Malicious actors around the world regularly target networked computer systems and websites for various reasons, including for exfiltration of sensitive information, disruption of services, and observation of online activity. Attacks that require exploitation of more than one target computer, for example obtaining proprietary knowledge of a product line being developed by a manufacturer, may require a series of discrete actions in order to complete the desired act. For example, these actions may include gaining access to a private network via a vulnerable host, leveraging that access to identify internal accounts that can be compromised, then successfully compromising those accounts to gain access to the information being targeted.

Effectively detecting a malicious actor or communication requires the ability to identify those actions which make up the steps the actor takes to accomplish its task. On large, active networks, such as the Internet or internal corporate or government networks, identifying this behavior from the much larger amount of non-malicious activity is a challenge and numerous approaches have been developed to attempt to perform the detection process.

One approach is commonly referred to as a signature-based approach. This type of approach is generally used in intrusion detection systems (IDS) and anti-virus programs. A signature-based approach requires prior knowledge of specific types of observed behavior associated with a malicious actor or malicious activity, such as exploits or exploit responses, which are used to identify the malicious actor or activity. The activity monitored on the network or on an individual computer are scanned against these known patterns, and alerts are generated when there is a match.

There are significant challenges that face a signature-based approach, including the inability to detect new, previously unknown types of exploits, the inability to identify non-suspicious behavior from a malicious actor, such as a successful login by an attacker using valid, compromised credentials, and the lag time between new attacks being utilized in the field and new signatures to detect those attacks being developed and deployed. Thus, signature-based approaches may be capable of detecting widespread, well-known attack types, but are ineffective at detecting unknown, novel, and subtle malicious actions.

Another common approach is referred to as an algorithmic approach. In an algorithmic approach, detection is typically implemented by continuously searching a large space of observed behavior (communications on a network or actions occurring on computers), attempting to delineate between suspicious and normal behavior. Once a suspicious activity is detected, alerts can be generated and the activity may be extracted from the other data that is being analyzed. This approach is commonly used in behavioral analysis systems.

The algorithmic approach suffers from some key challenges, including the need to collect and analyze large quantities of data, and to understand each particular observable action within the universe of possible actions with a degree of accuracy (and contextual understanding) necessary to make correct judgments regarding the maliciousness of the communication or actions. As a result, algorithmic approaches often produce interesting results in laboratory environments, but have significant difficulty providing actionable insights at scale, against real-world environments and attackers.

Another approach used in the industry addresses the problem by starting with the assumption that it is too complex and resource-consuming to attempt to understand and extract malicious behavior/actors from a vast amount of non-malicious behavior/actors. Instead, this approach focuses on the points where the malicious actors tend to attack: system vulnerabilities.

This vulnerability-centric approach is central to the development of honeynet technology, which involves the deployment of vulnerable hosts on a network that exist specifically to be probed, attacked, and exploited by malicious actors. In a honeynet system, the simulated hosts, called honeypots, have no legitimate use, so it is possible to identify the existence of malicious actors by observing their interactions with the honeypots.

A honeynet approach does have some drawbacks. Firstly, it is a resource and time consuming process to construct believable honeypot systems. There is also a generally low probability that a honeypot system will be attacked by a sophisticated actor targeting high-value systems since the attacker generally has a better understanding what targets are and are not of high value on a network. Also, it takes considerable time to perform forensics on compromised systems to understand the actions taken by the malicious actor.

As a result of these challenges, honeynets are often used to detect low-sophistication autonomous code that indiscriminately attacks networked hosts. Some work has been done to extend the honeynet concept beyond standalone hosts and to integrate with production servers. See, for example, https://www.owasp.org/index.php/AppSensor_DetectionPoints#HT3:_Honey_Trap_Data_Used. This approach utilizes the ability to combine IDS-like capabilities on the server itself in order to insert simulated information (referred to as honeytraps) onto the system. This approach increases the probability that an actor will fall for the simulated information since it is integrated into a production system.

The honeytrap approach has some key challenges, including a need to integrate a complex, error-prone IDS-like application into a target application, it is limited to web applications, is focused primarily on detection, and lacks additional capabilities to evaluate malicious actors and use manipulation to interfere with their goals.

At best, the current commonly used approaches including algorithms, signatures, and honeynets may be able to identify the existence of a malicious actor through their actions on an instrumented network. However, when dealing with sophisticated actors on large networks, detection may be insufficient to prevent further malicious activity.

Malicious actors can obscure their location by working through proxy systems, reducing the usefulness of identifying a single host. They may also work in concert with other actors to distribute their actions across multiple hosts and through the utilization of varied approaches, some of which may be detectable as overtly malicious activity (such as launching computer program exploits), or they may utilize previously compromised information (such as valid account credentials) in seemingly authentic ways. As such, a system is needed that is sufficiently robust to detect, manipulate, and evaluate these sophisticated malicious actors in a cost-effective and efficient manner.

SUMMARY OF THE INVENTION

The present invention is directed to a system that detects, analyzes and controls malicious actors on a network or computer system. In one embodiment, the system incorporates sequences of synthetic vulnerabilities into production systems at locations where malicious actors are most likely to be looking for them. The system's detection points (in this example they are detecting access to the synthetic vulnerabilities, but the system supports a wide range of different detection point types) present the opportunities that malicious actors are looking for and are used to perform one or more of the following: detect malicious actors, manipulate their actions, gather intelligence on the malicious actors, and evaluate their capabilities. As used herein, the term "malicious actor/communication" is not limited to an unauthorized individual, but is intended to broadly include incoming communications initiated by an unauthorized person or program, as well as activities occurring on a network or computer and which are associated with one or more unauthorized entities, authorized entities performing unauthorized activities, or an autonomous or semi-autonomous program communicating across a network or operating on a host. Also, as will become apparent below, the term "malicious actor/communication" may also be applied to communications that initially are indicative of any of the foregoing (e.g., potentially malicious communication/actor), even though subsequent analysis might determine that the communication is not malicious. Furthermore, a "detection point" is not limited to programming mistakes in the code of an application, but includes any disclosure of information, indication of system operation, prescribed location, potentially compromisable application, or other content that may be utilized by a malicious actor in the attack, compromise, or disabling of computer systems, or the acquisition, destruction, or modification of information. A detection point can also be the content that drives or tracks a certain activity that indicates that the communication is malicious, is from a malicious or unauthorized source or has a malicious intent. As used herein the term "computer system" encompasses a single server/harddrive, as well as multiple servers and/or computers on a network or enterprise system platform.

By approaching the problem from the vulnerability side, the present invention takes advantage of the ability to identify malicious activity by monitoring actions which exploit synthetic vulnerabilities (or other detection point types), and provide immediate detection. This helps eliminate false negatives. The system is designed to include a series of detection points such that the exploitation of one detection point leads to another. By doing so, it is possible to include a series of planned steps or missions, that a malicious actor is exposed to and is manipulated into following.

As the actor moves through each step in the mission, numerous data points are collected to evaluate or characterize the actor, including one or more of the following:
  a) the types of vulnerabilities the malicious actor is looking for and capable of identifying;
  b) the tools and techniques utilized by the malicious actor to exploit the vulnerabilities presented;
  c) thematic focus based on what content the targeted systems contain or what they are used for;
  d) prior knowledge about the system that the malicious actor uses in their attempts to exploit the vulnerabilities; and
  e) shared knowledge between systems or users who take part in the malicious activity.

The mission fabrication approach is implemented by first intercepting the communication from a (potentially malicious) client source or program to a target program. The interception may take place at any point in the transmission, processing, and response of the communication. Interception at the network level can be performed using an inline proxy system similar to a network firewall or IDS. On-host interception may be performed by instructing the program processing the communication to forward communications to another system for processing. Similarly, on-host interception may take place outside of the server application context by acting at the operating system or hardware level. That intercepted communication is provided to a program that is capable of analyzing the activity and modifying the content. The program contains a list of detection points.

The "matching" section of a detection point defines the specific circumstances under which actions on the communication are to be taken. Any feature or set of features of the intercepted communication may be used to perform a match operation. For example, a match against a communication to a file server may include the source address of the host making the request, the file being requested, the directory where the file resides, the time of day the request is being made, or the user making the request. A match may also take into account a set of additional information outside of the communication content. This may include prior knowledge that the source has previously been identified as a malicious actor or knowledge inferred from the actions taking place such as predicting the types of files a malicious actor is looking for based on the names of the files they are accessing.

The "action" section of a detection point defines what actions are to be performed when a match occurs. If the communication satisfies the detection point's matching section and thus a malicious actor/communication, the actions performed on the malicious actor/communication can include the addition, modification, or deletion of content, transparent redirection of the malicious actor/communication to a separate server (called a vulnerability server) where the request will be processed as though the vulnerability server was the original destination, recording of the activity for use in future matching operations, or additional actions defined by the users of the system. Modifications made to the content, such as additions or deletions, can be made directly to the malicious actor/communication itself, or by influencing the actions of the destination server that it is intended for. For example, a malicious actor/communication that contains the contents of a web page that has been requested may be intercepted at the network level and the response content modified to insert additional text into the body of the website. For example, the system may modify the contents of a login page HTML to include a fabricated error message that indicates the login page is vulnerable to a SQL injection attack. Alternatively, a file server program may be instructed to return a "file not found" result when the detection point matching process identifies that the source is a known malicious actor based on previously detected activity against other detection points. The modified malicious communication content or response from the vulnerability server is then injected back into the communication stream and delivered back to the client in a way that does not indicate that the modifications/redirection took place.

The creation of detection points may be performed using either manual creation of a detection point description file, programmatically in response to observed activity (e.g. an action taken by a malicious actor may be used to create one or more additional detection points), or through a graphical user interface that enables the user to create detection points, define missions, and associate individuals or groups of detection points to form steps inside of a mission. The rules language used for detection points contains the ability to develop arbitrary taxonomies for evaluation based on user-defined categories and reports associated with each detection point. The reports may contain a scoring component such as a numeric value of points and category string used to further analyze, categorize, and rate attacker actions. An individual detection point can contain numerous match, action and reporting entries, allowing an individual communication to be evaluated in multiple ways simultaneously. Reports are generated whenever a communication meets the requirements for insertion of a detection point. Triggered detection point reports are sent back to an analysis server which assigns the reports and associated scores of a given detection point to the source of the malicious actor/communication.

This approach uses some of the asymmetries which attackers exploit to cause the attacker to question the information that it might acquire. This approach also means that the testing by a malicious actor of a system for a vulnerability now creates a potential liability for the actor—that their actions may be used against them for the purposes of detection, manipulation, and evaluation.

The present invention does not require large-scale data collection capabilities and network modifications, bandwidth/storage/throughput/security constraints in order to deploy the present invention. The detection capabilities can be built into places where the actors can do the most damage, e.g., file systems containing high-value data, applications that implement nightly builds of mission-critical software, or gateway systems that can be used to exfiltrate compromised data. The system can reduce false positives by choosing detection points that would be of no use to a normal user, such as password protected systems, fabricated accounts, and unlinked web pages.

The foregoing and other features of the invention and advantages of the present invention will become more apparent in light of the following detailed description of the preferred embodiments, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For the purpose of illustrating the invention, there are shown in the drawings embodiments that are presently preferred; it being understood, however, that this invention is not limited to the precise arrangements and constructions particularly shown.

FIG. 2 is a schematic illustration of an in-line configuration of the present invention.

FIG. 3A is a schematic illustration of an out-of-band configuration of the present invention.

FIG. 3B is a depiction of the communications flow in one embodiment of the out-of-band configuration of FIG. 3A.

FIG. 4 is a schematic illustration of an on-board configuration of the present invention.

FIG. 5 is a schematic illustration of a detection Point Taxonomy according to the present invention.

FIG. 6 is a schematic illustration of a fabricated mission according to the present invention.

FIG. 7 is a schematic illustration of a characterization of a malicious actor/communication according to the present invention.

FIG. 8 is a schematic representation of a distributed architecture that can be used to implement the present invention.

DETAILED DESCRIPTION OF EMBODIMENTS OF THE INVENTION

Figure 1:
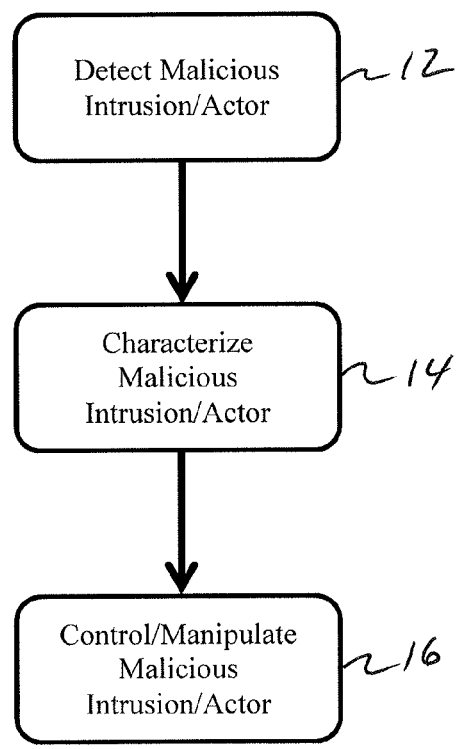
FIG. 1 is a schematic illustration of the operative stages of the present invention.

As described above, the present invention addresses the challenge of identifying and responding to malicious actors targeting computer systems. In the fast-changing world of computer security, simple detection and attempted blocking of a specific attack is insufficient to counter the real-world threat posed by sophisticated adversaries working individually, from multiple source locations or in organized teams. What is needed is a method whereby the actions of the actors themselves can be utilized to provide detection of their behavior followed by the manipulation of those actors.

As described in FIG. 1, the present invention 10 includes five primary functions or steps: (i) the creation of missions and detection points designed to detect and capture or direct/redirect. (ii) the implementing, integrating, or applying of one or more detection points in a target system (such as a computer system or network) 12; (iii) the detection of a malicious actor/communication that is directed to or has infiltrated the computer system or network 12, (iv) the characterization of the malicious actor/communication 14, and (v) the control or manipulation of the malicious actor/communication 16. While the invention will be discussed primarily as implemented on a network, it is also applicable to any computer based system, and can be run across a series of networks and computers simultaneously. The present system is designed to not be application or system specific, meaning that it can be deployed over any number of instrumented hosts systems and different levels (hardware, software, operating system, etc.) running any number of instrumented services.

As will be discussed in more detail below, in one embodiment, the detection step 12 involves the use of detection points (in this case synthetic vulnerabilities) that are introduced into or vulnerabilities that already exist in the system or structure being monitored to detect or intercept a malicious actor/communication. As used herein, a synthetic vulnerability is an access or exploitable point in a system. It may be a simulated or fabricated vulnerability so as to provide a perceived access to a desired system, program or file, or may be an actual known access point that is used in the invention. Also as discussed above, the phrase malicious actor/communication includes not only unauthorized individuals or entities, but also communications, programs, or actions that originate from an unauthorized source (such as a virus), or originates from an authorized source but engages in an unauthorized activity (such as an insider attempting to access unauthorized files) or a communication, program or action that attempts to cause, create or generate an unauthorized action (such as a key tracking program).

The characterization step 14 involves analyzing the activities that the malicious actor engages in (such as the vulnerabilities that are targeted), to determine some information about the malicious actor/communication (e.g., what it is seeking, who might be behind it, how it accomplishes its malicious activities, etc.). The control/manipulation step 16 involves directing or altering the malicious actor/communication to accomplish a goal such as detecting the malicious actor/communication's existence and preventing harm to the target system. The manipulation process is intended to provide administrators with the ability to direct a malicious actor/communication's actions without their knowledge in order to accomplish a goal such as preventing a malicious actor/communication from successfully exploiting valuable targets and collecting information to permit further characterization and manipulation of the malicious actor/communication. This may involve, for example, directing the malicious actor/communication to an alternate server, permitting the malicious actor/communication to capture fake information, or modifying the malicious actor/communication to eliminate the harmful aspects. The approach may also significantly increase the time and effort necessary for a malicious actor/communication to proceed through an environment. If the malicious actor/communication realizes that its actions may lead to their immediate identification, and that any resulting information obtained through those actions may be untrustworthy, then the malicious actions become less desirable.

Detection and manipulation alone can be utilized to disrupt the process of malicious actor/communications. However, malicious attacks will evolve as new methods and techniques are implemented. Also, the malicious actions themselves are generally a subset or portion of a plan. As such, it is important to extract value (information) from the malicious actor/communication's activity based on its detection and action upon manipulation. One method for gathering that information is by evaluating the activity that is observed across multiple axes, such as the actor's timing, location, capabilities, tools, and prior knowledge. For example a malicious actor/communication that interacts with a server that controls a building's power system may indicate their intent is to observe or disrupt the operation of that building. The time at which a malicious actor/communication is operational may indicate the time zone and, thus, region of the world from which they are operating. The information gained through these different axes can be used to extract additional understanding about the malicious actor which can in turn be used to predict the future actions of the malicious actor or the information sought by the actor, and drive the adjustment of the vulnerabilities or detection points that the malicious actor/communication is presented (e.g., dynamically altering the mission). Analyzing the malicious actor/communication can also be used to determine who the initiator of the intrusion is, or what they are seeking, as well as help develop further detection, manipulation, and evaluation processes. This is referred to as characterizing the malicious actor/communication, and the evaluation steps are part of the characterization step.

Evaluation of malicious actor/communications is greatly enhanced by the implementation of fabricated missions. The detection point insertion process (e.g., inserting multiple vulnerabilities into the system being monitored) enables a variety of types of detection points that a malicious actor/communication can interact with. Detection points and the relationship between detection points can be utilized to evaluate malicious actor/communication behavior in numerous ways, including any or all of the following:

a. Crafting detection points that require the exercising of various skills (and levels of skills) to successfully exploit. For example, a web application may contain a detection point that implements a complex database injection vulnerability that could only be identified and exploited by a malicious actor/communication skilled in exploiting those types of vulnerabilities.

b. Crafting detection points that lead to additional detection points to make it possible to determine shared knowledge when associated actions are taken from different source locations. For example, a file containing a set of usernames and passwords may be inserted into a hidden directory in a fileserver to be later found by a malicious actor/communication. Any use of those specific passwords elsewhere on the network indicates that it is sent by the original malicious actor, or another actor with whom the original has shared the usernames and passwords.

c. Tracking the sets of skills demonstrated by a given actor in order to create a skills profile that can be compared to other activity to determine if it is the same actor launching attacks from different sources.

d. Providing detection points that lead to systems with no known vulnerabilities and observing whether the actor utilizes previously unknown vulnerabilities to exploit the system.

e. Creating missions where the intended goal is of a specific category or type (i.e. collection of trade secrets, disabling of security systems) and determining interests of an actor based on which missions it pursues.

Evaluation or characterization enables a deeper understanding of the malicious actor/communications and permits a variety of actions to be taken in response to the activities. These can include the identification of previously unknown vulnerabilities and capabilities, the creation of further missions that exercise known capabilities or interests of the actor, and prediction of the methods with which and locations where an actor is likely to attack next and placing missions in those locations.

The following sections describe the various components of implementing fabricated missions through insertion of detection points in production servers.

Interception of Communications

Inserting detection points into a production system can be accomplished a number of ways. One method is to insert them directly on the production systems, such as by installing vulnerable applications or fabricated content on an existing server. This approach can provide the most realistic implementation. For example, the code for the login page of a web application could be modified such that it returns a type of error message that indicates (to an experienced attacker) that the page is susceptible to a code injection vulnerability. The error message would only be triggered in circumstances when invalid content (such as non-character data) is entered into the username and password field, as is often done by attackers who are probing a system for code injection vulnerabilities.

An alternative approach is to intercept communications (or subset of communications) destined for a program on the production system, and modify the contents of the request and responses of that communication. This approach can be implemented either by intercepting the communications at the network level, as in a network proxy. This approach is similar to a network firewall or intrusion prevention system, whereby a separate host is placed on the network between the client and the server. All traffic (or all pertinent traffic or subset of traffic) to the server flows through the proxy host, providing the proxy host with the ability to modify the content sent to the server and returned by the server. Interception may also be accomplished by the insertion on the target application of code that is capable of capturing the request and response communication, allowing modifications to that communication, and re-inserting the modified communication back into the processing flow of the program. This type of interception can occur at the server application level, at the operating system level, or at the hardware level.

One example of server-level interception is the use of web application firewalls. These systems are capable of intercepting requests for web pages on a webserver and evaluating their contents prior to the communication being processed by the webserver. The approach to intercepting communications at the server can take place using built-in application programing interfaces (APIs) that enable third-party software components to access and modify communications. Web application firewalls built for a specific web server application may use these hooks to modify, and re-insert the contents of both HTTP requests and responses. In this example, a client request is sent to a webserver, the communication is received by the webserver that sends it to the third-party program for analysis and modification. The third-party program performs any modifications of the content, and the modified content is then returned to the webserver where it is processed as if the modified communication was the original. The results of processing that request are sent from the webserver back to the client who initially made the request.

The communication may also be intercepted at the operating system level. This can be done through modification of the operating system code itself to intercept communications or through the use of operating-system-specific APIs that enable third party programs to access communications as they are received and responded to by the operating system. One example of this operating system level interception process is host-based firewalls that are capable of accessing all incoming and outgoing network communications. Any incoming network request that is received by the operating system is sent to the firewall logic where it is evaluated and the content may be modified before being sent to or from the destination server program.

An alternative approach would be to use the access provided by the operating system to modify the operating process of the destination server. This can be accomplished by modifying the in-memory representation of the program in order to insert a custom API to intercept data sent to the target server program. This technique is similar to those used by debugging programs in order to view and modify the state of an operating program.

Communications may also be intercepted based on modifications to the underlying hardware. This can be performed by either direct changes to the physical devices such as network interfaces, CPUs, memory and associated data busses on a computer system, or through the modification of the virtual equivalents of these channels when the operating system is running in a virtual hardware environment.

Physical modification capable of intercepting communications is used by hardware manufacturers during the testing and development of new hardware in order to observe and modify the behavior of the system without needing to rebuild the hardware. Modification of virtual hardware is used in some virtual hardware implementations to provide the ability to observe and restrict access between programs and files through the creation of access policies that reside outside of the operating system environment. Those techniques can be applied in the current invention to intercept and act on a malicious communication.

Combinations of the foregoing techniques can be incorporated into the system as sequential detection points for acting on a malicious actor/communication.

In one embodiment of the present invention, a processing engine is provided that includes a program that is designed to intercept communications between two programs (such as communications between a client web browser and a webserver), analyze the content, modify it if necessary, and re-insert this communication back into the communication stream. The analysis and modification process is defined by a list of detection points used by the program. A detection point is comprised of a series of match, action, and reporting rules that are applied to communications (as discussed above). The processing engine is responsible for implementing the detection points in the communication flows. The engine implements the detection points by taking each received communication (or subset of received communications) and comparing it to its detection point's matching rules. If the communication meets the requirements defined in the matching rules (e.g., satisfies the rules) for a detection point, then the engine performs the actions (if any) described in that detection point's action rules. Following these steps the engine generates reports based on the reporting rules (if any) of the detection point. The engine is capable of performing each type of interception—network based, server-level, operating system-level, and hardware-level collection. This enables a variety of deployment architectures.

FIG. 2 depicts one embodiment of an in-line, network-based system 20 for intercepting communications. In this embodiment, the engine system 20 is located between the external malicious actor/communications (potential sources of unauthorized intrusion) 22 and the production system 24 (shown as target servers 24). The engine system 20 is a front end to the target systems, and is set as a proxy for the target system 24, i.e., the engine 20 maintains the target IP address and is responsible for forwarding/directing requests on to the correct target systems 24. Alternatively, the engine system 20 can use a lower-level protocol than IP that does not rely on IP addressing, similar to a firewall or intrusion prevention system (IPS), and include a form of network bridging to intercept and modify the communications that pass through it. In the in-line configuration of FIG. 2, the engine 20 is programmed to monitor inbound requests and modifying them (if necessary) before they are forwarded to the target servers 24, as well as monitor outbound responses and modifying them (if necessary) before they are returned to the client. In in-line mode, the engine receives every (or a subset of every) request and response that is sent to the target servers 24. Each communication is matched against the detection points running on the engine. In the event that a communication satisfies a detection point's match rules (a malicious actor/communication), that detection point's actions are applied to the communication. The actions may encompass a range of activities including modification of the communication's content. If the communication does not satisfy the match requirements for the detection points it is forwarded on without triggering any action rules. As discussed below, upon capturing or detecting a malicious actor/communication, the engine 20 can direct the communication to an external vulnerability server 26 that includes more detection/vulnerability points.

FIGS. 3A and 3B depict an out-of-band or backend analyzer configuration. In this configuration, communications 30 are redirected from the target server 24 using an on-board module 32 and forwarded to the engine 20 for processing.

That is, communications or actions 30 are directed to a server 24 (or target program 34 on the server 24) are channeled from the server 24 to the engine 20. The redirection can take place using a module 32 that is integrated with the server program 34 itself, with the host's operating system or with the host's hardware 24. In this configuration, the engine 20 receives the requests 30 before they are processed by the target program 34. The engine 20 compares the communications to its detection point's match rules and takes actions on communications based on the action rules of the detection points whose match conditions are satisfied (malicious actor/communications), and then sends the potentially modified malicious actor/communications 36 along with non-matching communications to the target program 34. Although, not necessary, the malicious actor/communications can be changed so that the target program 34 views the engine 20 as the originator of the request. The target program 34 acts upon each malicious actor/communication and sends a response 38 (i.e., a reply to the original request from the malicious actor/communication) to the engine 20. The engine 20 can then perform matching and actions on the response 38 before sending the potentially modified response 40 to the module 34 on the target server 24 that performed the redirection. The module 34 is then responsible for returning the modified response 40 to the originating client (the source of the malicious actor/communication) 22. This embodiment is particularly useful when it is desirable to locate the engine 20 at a location that is separate from the system being monitored, such as a separate host on the network.

Turning now to FIG. 4, an embodiment of the invention is shown which depicts an on-board configuration where the engine 20 is run directly on the target server 24. This can be implemented either as an on-board proxy, similar to a host-based firewall, or in a manner where the engine communicates with the target server using local networking, such as through the target server's localhost interface, or through interception of communications at the operating system or hardware level. In this configuration, the communication redirection can take place either as an on-board module integrated with the target server or by utilizing host-based modifications on the system. The communications pass between the outside client, the engine and the target program in a similar manner as in FIG. 3B although the communications between the target program and the engine occur on server 24 itself In each of these configurations, the key elements of interception, matching, actions, and re-insertion take place in a manner that does not necessarily require any action on the part of the malicious actor/communication beyond the actions that they have chosen to take against a target. The specific mechanism used to implement the interception can be varied depending on the needs of the specific deployment (access to the network, ability to modify server configurations, ability to run additional programs on servers). The configurations can also be changed from one to the other with limited impact to the other components of the system (detection points, analysis server, etc.)

Operations Performed on Communications

As discussed above, once the communications have been intercepted and forwarded to the engine 20 it may be desirable to take action based on the content and context of the communication. Detection points are comprised of a set of match rules, action rules, and reporting rules. An engine may be configured with one or more detection points. The communication is first matched (as discussed below) against the matching rules of detection points configured on the engine. If the matching rules of a detection point are satisfied the engine performs the actions specified in that detection point's action list. Following those steps the engine generates a notification that the detection point has been triggered which, if the report rules of the detection point specify, is used to generate the reports based on those report rules. FIG. 5 depicts the taxonomy for detection points which may include any number of matches, actions, and report statements. The engine is programmed with the necessary coding to match communications, take the necessary actions defined in the action rules, and generate the defined reports.

In one embodiment of the invention, the malicious actor/communication is modified by adding features to it, such as a tag, that facilities later actions on the communication. The tagging process creates a state-based history that can be leveraged by other detection points. The tags may be inserted in the malicious actor/communication itself or stored by the engine itself. For example, a web communication may be intercepted and determined to be a malicious actor/communication. The engine may insert an additional string into the communication's cookie header that identifies the source as a malicious actor/communication and return the modified communication back into the communication stream. The cookie value will be stored by the malicious actor/communication's web browser and resent with other subsequent requests from that web browser. The engine can then use the cookie value as part of a match rule in other detection points to determine additional actions to take on the communication such as recording the request.

The tag may direct the engine to replace files on or attach files to the communication from ones stored in a repository that are specifically adapted for malicious communications. For example, if a malicious actor/communication is seeking a list of usernames and passwords, the tag my direct the engine to attach a file of fake usernames and passwords instead of the real file that the malicious actor/communication requested.

Matching

The matching process is used to determine whether a detection point's actions should be taken on a communication and/or whether the communication should generate a set of reports. The matching process can utilize any form of information contained in the communication, information relating to the state of the communication, or information relating to the source or destination of the communication. The matching statements are used to determine whether actions are taken. The actions that are taken may include modifying the communication to make the attacker think that there's a vulnerability on the system. For example, a match against a communication to a file server may include the source address of the host making the request, the file being requested, the directory where the file resides, the time of day the request is being made, or the user making the request. A match may also take into account a set of additional information outside of the communication content. This may include prior knowledge that the source has previously been identified as a malicious actor/communication or knowledge inferred from the actions taking place such as the prediction of the types of files a malicious actor/communication is looking for based on the filenames it has chosen to access. This outside knowledge is used to create a form of persistent, stateful memory about a malicious actor/communication, server, or other status of the system being monitored.

The matching process can take place on both the incoming requests and the outgoing responses as well as requiring components to be matched in both the request and the subsequent response before actions or reports are generated. The matching process can be performed using a variety of methods, including static pattern matching, regular expressions, or programmatic evaluation of the data such as that needed to decrypt or decompress a communication to perform additional evaluation. In addition, matching statements can be created to test for the absence of a match. For example a match rule may be satisfied if a given communication does not contain a specified piece of content. While existing anti-virus rules are designed to match against known attack activity, the rules in the present invention match against any type of activity, be it known attack, unknown attack or normal use. The system then allows users to create a series of actions that are taken on a communication in order to detect, manipulate, and evaluate the attacker. The matching process can utilize a variety of match statements in one detection point, enabling fine-grained matching across multiple components of the content and context of the communication. For example, placing multiple matching statements in a single detection point makes it possible to match a request to a website, where information in the request header (such as cookies), contents of the body of the message (such as form fields), and status of the interaction (e.g. information about the malicious actor/communication's targets of interest), could all be taken into account to determine if the detection point's actions are to be taken on the communication.

The set of match rules above could be used to detect and redirect a malicious actor/communication that is attempting to login to a website using a set of compromised credentials. For example, a single detection point that could match against this behavior would contain a match rule requiring the path to the website's login page (e.g. http://website.com/accounting/login.php) that could use character matching to compare the rule against the page name being requested by the malicious actor/communication. A second match rule would indicate that the detection point should only take actions on requests to the target server (rather than on replies from the server). A third match rule would use a regular expression to match on the absence of a specific header entry, "Cookie", with value "uuid=" (this indicates that the user is not logged in). A fourth match rule would use character matching of the username field to compare the username and password being attempted against a set of known compromised credentials (these credentials may have been intentionally disclosed through other detection points). A fifth match rule would search internal state entries associated with that source to identify if the source IP address is associated with a known malicious actor/communication and return any known areas of interest that had been ascertained through previously observed activity (e.g. that the actor is interested in obtaining "trade secrets", "network diagrams", and "employee names").

It is also contemplated that a matching requirement may be the absence of certain information that is expected in a communication as indicative of the communication being malicious or from a malicious source.

Actions

Once a detection point's matching statement conditions have been met, the communication (which is a malicious actor/communication) can be acted on by zero or more action statements. The action rules contained in a detection point may define a range of actions including an activity that is to be performed on the malicious actor/communication, analytic processes that are to be run, updates to the system's internal state information, or modifications made to the existing detection points or analysis components.

The system's modification process can utilize any of a variety of mechanisms to perform the modification, including static string insertion, regular expressions, dynamically generated content created by programs specific to the detection point or included as a library, or information that is used to modify the existing detection point, add new detection points, or modify other existing detection points.

In one form of modification, which can be in addition to or as an alternate to modifying the content of the malicious actor/communication, the engine may modify where the malicious actor/communication is intended to go. That is, the engine may redirect a malicious actor/communication to a separate server (referred to as a vulnerability server) and the resulting response traffic from the vulnerability server is re-inserted as the communication's response (after being matched against any relevant response-oriented detection points) in such a way that it appears to the malicious actor/communication that the response was generated on the target server. This approach could be used, for example, to redirect requests that are intended for a specific directory during an FTP session to a vulnerability server containing additional directories and files that would appear, to the malicious actor/communication, to reside on the target server.

As with the matching statements, a detection point may contain any number of action statements, enabling a variety of changes to be made by an individual detection point when it is triggered. Multiple action statements can be utilized to make extensive modification to a communication in order to add new content such as to simulate vulnerabilities for a malicious actor/communication to interact with, synthesized information intended to confound (dilute, diffuse, distract the actor's attack), or manipulate the malicious actor/communication, or to cover or hide the processing by the detection point modifying content in the communication that would otherwise indicate that the detection point system is in operation on the target server (for example, adjusting response timing and protocol state field values).

The following is an example of one set of the types of actions that can be performed on a communication—it continues the example from the Match section above.

The previous section described a detection point whose matching rules would be satisfied if a communication was received that contained a fabricated username and password sent to a website's login page by a user who was not logged in on a computer that had previously been associated with a malicious actor/communication. Since the matching rules for that detection point were satisfied, the action rules associated with the detection point would then be triggered. The actions taken under these circumstances may include the following.

One action rule would modify the malicious actor/communication to have it be redirected to a vulnerability server pre-populated with fabricated information associated with the malicious actor/communication's areas of interest such as fabricated employee names. Numerous vulnerability servers could exist, each containing different forms of fabricated content. In this case, the malicious actor/communication's previous interests were used to dynamically associate a given set of credentials with a vulnerability server containing the sought after content. As a result of the redirection, the malicious actor/communication's would believe that they have "struck gold" and used the compromised credentials to access a system that happens to contain information that they were interested in.

A second action rule would insert a state entry associated with that malicious actor/communication that would cause all future connections to the internal pages of the website originating from a source associated with the malicious actor/communication to be redirected to the vulnerability server.

A third action rule would create a new detection point that ensured that any future use of that username or password would cause the malicious actor/communication to be automatically redirected to the selected vulnerability server. In this way, if the malicious actor/communication shares the username and password with others or logs in from a host that has not been associated with that malicious actor/communication, the connections will lead to the content expected by the malicious actor/communication. If this was not the case, then future logins may result in a different vulnerability server selection, which could be used by the malicious actor/communication to detect that they were being manipulated.

Reporting

Following the actions taken on a malicious actor/communication, zero or more reporting statements may be generated by the detection point indicating that the specific detection point was triggered. The reporting statements may include alerts which contain information on the specific activities of the detection point, scoring reports which are used in the evaluation of actors and their behavior, and/or log statements which are used for system notifications such as debugging.

As with the previous statements, multiple report statements can be included in an individual detection point. There may be certain situations where it is not necessary to generate an alert at each detection point, such as when several detection points are used together. In that situation, it is contemplated that a certain or the last detection point in the sequence is set to generate a report or alert. Multiple report statements can be utilized to feed information to components of the system that keep track of a communication state. Multiple scores from one or more detection points allow an individual communication to be evaluated across multiple axes (e.g. areas of interest, tools used, skills demonstrated, skill levels demonstrated, etc.) and will be further discussed in the evaluation section. Multiple log statements enable a series of specific notifications to be generated from an individual detection point that can be used for fine-grained system debugging.

Each report statement may include a variety of sections. These include a value used to identify the severity of an alert from the malicious actor/communication, the number of points received from a scoring report associated with the malicious actor/communication which may indicate the severity or complexity of the attack, or a warning level for a log message. The messages may also include category and sub-category fields, enabling the creation of taxonomies of report messages. For example, a log message may include a top-level category of Debugging and a sub-category of Pattern Matching referring to the portion of the detection point processing workflow that the log message's information relates to. Specification of the category, sub-category, messages, and numeric values can be defined by the users of the system and adapted to their specific needs. Each report may also contain a description field containing additional information regarding the specifics of that entry. Each of these reports are preferably generated when a detection point is triggered and the information generated or being sought may be stored in an analysis server (described below) for further evaluation.

Continuing the example from the match and action sections above, the malicious actor/communication using the fabricated credentials would be redirected to a vulnerability server containing information pertaining to the actor's previously identified interest in employee names. The final step in the detection point implementation process would be the generation of a series of reports associated with this activity. A set of reports that could be generated include the following.

An alert report indicating that the detection point was triggered would be generated to record the time at which the malicious actor/communication was observed, the host from which the malicious actor/communication originated, and a brief summary of the actions taken. The category of the alert report would be "Successful Redirection" (based on the primary action that impacted the actor's communication) and the severity would be "High" (as this detection point resulted in a number of modifications to the deployment and represented the ongoing progression of a malicious actor/communication's activities).

A score report would be generated for the malicious actor/communication with category "Fabricated Credentials Used" (based on their use of the fabricated username and password used in the login) and a score of "+1" would be awarded to the attacker since the use of the credentials resulted in the successful access to the vulnerability server.

A log report would be used to indicate that a new detection point had been generated (in this case, the detection point that redirects all future use of the username and password combination to the selected vulnerability server). The category for the log report would be "New Detection Point Generated" and the Severity would be "Low" (the creation of the detection point is less important than future activities that trigger the new detection point).

Used together, the match, action, and report statements create detection points that are capable of describing highly-specific set of operations taken on intercepted communications. Detection points can be created and stored in a database, where statements can be added, removed, or modified, and output as a static file containing each of the detection points that are to be used by a particular engine, or read directly into the currently running memory of an existing engine process without the need to be written to a disk.

It is preferable that the specific detection points are part of a configurable detection point rules file so that they can be readily applied to or used by an existing engine. The configurability permits the detection points to be tailored to the system that is being analyzed and updated and improved easily. For example, new detection points or modifications to existing detection points can be uploaded to a running engine by replacing the engine's detection point file or through directly writing them to the engine via a communication interface which may include the one used by the engine to receive intercepted communications or transmit notification that a detection point has been triggered. When updates are received over the network, the engine compares the source of the update with a pre-defined list of sources that are allowed to submit updated rules. An encryption step may also be utilized to provide authentication and confidentiality of the new set of detection points that are uploaded in this fashion. Once an engine has imported a detection point rules file the engine is responsible for implementing the action and match statements of those detection points.

In operation, all communications that are received by the engine are first compared against the matching statements of the detection points. If the match statements are satisfied, then the engine implements the action statements. In the event that the actions include the redirection of a communication to a separate vulnerability server, then the engine is responsible for establishing that connection and inserting the response (which may be acted on by additional detection points) back into the communication. Depending on the implementation, the engine may not directly implement the reporting process, and may, instead, be programmed to notify an analysis server or program that a certain detection point has been triggered along with information such as the time, client location, and server where the actions were taken. It is then the responsibility of the analysis server or program receiving the notification to implement the steps necessary to generate and save each report statement.

Each of the detection point operations that are implemented by the engine are defined as self-contained modules, where each module implements a specific action, match, or report capability. In this fashion it is possible to quickly create and insert new operation types onto the engine by uploading new detection point operation modules. The modular architecture also makes it possible to deploy an engine with only those modules necessary to implement the actions and matches that are needed by the detection point rules file deployed on that engine.

Fabricating Missions

Detection points provide a flexible method for describing modifications to intercepted communications and the situations under which those modifications are to take place. This concept by itself is generally similar to those used to define rulesets for firewalls, intrusion detection systems, and some antivirus software. Unlike those systems, which are intended to match against a single act (be it the blocking of a network port by a firewall, the detection of a specific attack by an IDS, or a specific virus by an insider), detection points in the present invention are designed to encourage malicious behavior by manipulating information in existing communications.

The use of detection points in the present invention makes it possible to link a series of detection points together in order to direct a malicious actor/communication through a logical series of steps which the malicious actor/communication believes are furthering its goals. In the present invention, a series of detection points that form a logical path for malicious actor/communications to follow are referred to as "missions"—where each step in that mission may be composed of one or more detection points. Combining detection points into missions moves beyond the limited alert-based approach of IDS, firewalls, and anti-virus programs and enables a much wider range of responses to malicious actor/communications.

Detection points may be utilized by inserting into target servers synthesized vulnerabilities and information that would be of interest to a malicious actor/communication, but that would be not seen or would be ignored by normal, non-malicious users. For example, a login page of a website may be modified using detection points that are capable of matching against common form-field exploitation patterns and redirecting those requests to a vulnerability server that responds with an error indicating that the attack traffic caused a (potentially exploitable) error condition. In this situation, normal users would not be expected to submit information containing the attack strings to the login page and, were they to do so, they would receive an error message. A malicious actor/communication who observes the error message and who is interested in gaining access to the contents protected by the login page may then continue to probe the observed vulnerability in search of the correct exploit string necessary to gain further access. The system 10 is now "tracking" in essence this malicious actor/communication by permitting it to continue to probe the system. Additional detection points can be placed on the system that would be triggered by the exploitation activity that the malicious actor/communication is engaging in, resulting in different output being generated by either the detection points themselves or through redirection to vulnerability servers. Each time a specific detection point is triggered, reporting statements record the attacker's actions for further review.

In this way it is possible to craft a mission by creating a set of detection points that present a path for a malicious actor/communication to identify a synthetic vulnerability, attempt to exploit it, gain access by successfully identifying an exploit for the vulnerability (which may be executed on a vulnerability server), and providing the actor access to the vulnerability server where it is possible to further observe their behavior. By placing a series of detection points together in a mission, it is possible to identify the further attempts at exploitation of the vulnerability, indicating that the actor is attempting to exploit the vulnerability through malicious activity. Each step that a malicious actor/communication takes along the mission path provides additional information about their actions and further differentiates their activities from those of non-malicious actor/communications.

By describing detection points that trigger only under circumstances that are outside of the normal operating procedures of non-malicious actor/communications it is possible to detect malicious actor/communications. This approach is similar to that used by honeynets and similar systems to observe malicious behavior. The difference here is that instead of utilizing standalone real or virtual hosts, the vulnerabilities being exploited are integrated directly onto production servers and production programs—the high-value targets that malicious actor/communications are seeking to probe and exploit.

Manipulation

Identifying that a malicious actor/communication is operating against a particular program or vulnerability is of limited usefulness when dealing with actors that can launch probes and attacks from multiple hosts or who may route their traffic through intermediary hosts to prevent identification of their location. Moving beyond detection, manipulation is the process of utilizing detection points to subtly direct the activities of malicious actor/communications by providing them with information they believe to be real and trustworthy.

In the example listed above, once the malicious actor/communication has identified a successful exploit to the login page (implemented using detection points), they can be redirected to an application on a vulnerability server which contains additional false or synthesized information. This information may include misinformation as well as information that may indicate other potentially vulnerable systems (also implemented using detection points). Since the malicious actor/communication will believe that the system being accessed was a vulnerable production server they are led to believe that the information being collected is valid.

The manipulation process does not need to follow a strictly linear progression. It is possible to create missions that are comprised of a series of branches that a malicious insider may traverse depending on a number of factors. These may include branches that result in the revelation of specific types of information, branches that are only accessible to actors with a specific skill set, or branches that can only be traversed in the event that the actor is in possession of a specific set of information (which itself may have been fabricated using detection points).

By presenting the malicious actor/communication with numerous paths through a mission, it is possible to create and present more and more sophisticated environments through which to manipulate their behavior. This approach further distinguishes itself from that taken by existing security appliances by pro-actively directing the malicious actor/communication's activity as opposed to singular steps to block or identify attacks and suspicious activity. The missions are not limited to a single application, but can span multiple computer systems and programs where detection points are located.

FIG. 6 illustrates a simple fabricated mission containing multiple paths that a communication may be directed during the mission. In the figure, step one (DP 1) contains a detection point that modifies a page on a website to include a hidden comment indicating the existence of a file repository located at a complicated URL (e.g. http://website.com/marketing/file_repository3556456). The detection point causes the hidden comment to be inserted in the response data containing the web page content and is triggered anytime anyone requests the given page. The content will be sent to both legitimate and malicious actor/communications, however legitimate actors will not notice the hidden content. Malicious actor/communications, however, may identify the URL through examination of the hidden content contained in a page and choose to visit the repository URL in order to evaluate if it may contain information they are interested in. The use of the complicated URL reduces the risk that a legitimate user may "stumble upon" the application by inadvertently typing an address into their web browser.

Step two (DP2) contains a series of detection points which redirect requests to the repository URL from the target server to a vulnerability server containing the repository application. The redirection takes place in such a way that the malicious actor/communication visiting the URL will believe that the application is a part of the target website. Making a request to the file repository URL is a strong indication that the actor has observed the hidden comment placed on the first webpage while searching through the page's hidden content, and decided to access the repository despite having no legitimate reason to do so. This action indicates that the actor may be taking malicious actions. Once an actor reaches the page they must choose the route they wish to proceed through to get access to further information.

Step 3a (DP 3a) contains a series of detection points that implement a SQL injection vulnerability on the file repository's login page which, when exploited, will allow the malicious actor/communication through the login page. Step 3b (DP 3b) contains a set of usernames and passwords that, if used on the login page, will grant the actor access. The actor is free to attempt to exploit the vulnerability or utilize the usernames and passwords, or to attempt one route, then fallback to the second route. The use of attack strings to exploit the SQL injection vulnerability or the use of fabricated credentials clearly identifies that the actor is malicious.

Once the actor has successfully moved through step 3 (DP 3a or DP 3b) the actor is given access at step 4 (DP 4) to the vulnerability server's file repository that contains fabricated information that they can download to further their activity. The types of information that the actor is interested in can be used to further manipulate their behavior. For example the accessed information may contain additional usernames and passwords for use on other instrumented systems. Similarly, there may be additional inserted applications with vulnerabilities (real or simulated) that the malicious actor/communication could seek to exploit to reach their goals. At each step in the process, the malicious actor/communication's behavior is being manipulated through the presentation of fabricated mission paths that are created using detection points.

Evaluation

Manipulation of malicious actor/communications using fabricated missions can be used to accomplish a wide variety of goals. One use of the process is to craft missions in order to evaluate the capabilities, knowledge, and interests of the malicious actor/communications. This approach further distinguishes itself from conventional approaches of security systems by seeking to use the malicious actor/communication's steps through a fabricated mission to discern or learn aspects about the actor so as to enable further manipulation and detection opportunities.

The construction of the detection point process includes the ability to record the steps followed by a malicious actor/communication. The scoring component of reports provides one mechanism by which to evaluate malicious actor/communications. Using the scoring system it is possible to allocate point distributions for different aspects of a detection point. For example, a malicious actor/communication's interest in a particular branch of a mission that leads to information relating to trade secrets can generate scores for the category "Interest" with sub-category "Trade Secrets". The approach can be further refined with categories for specific areas of trade secrets. The more areas associated with a specific topic, the higher their cumulative scores associated with that category of interest.

Referring to FIG. 7, examples of two different missions 100, 100' are shown which identify distinct information being sought by the malicious actor/communication 22. In the first mission, the malicious actor/communication 22 is presented with a vulnerability that identifies customers 102 of a company. When exploited, the malicious actor/communication 22 is given access to vulnerabilities related to potential customers 104 and existing customers 106. When the actor exploits the vulnerability associated with the existing customers 106, the actor is given access to vulnerabilities associated with existing customer names 108, products purchased 110, and social security numbers 112. Using the information shown in FIG. 7, the analysis server or program can determine that the malicious actor/communication is primarily interested in compromising the social security information that the company has for existing customers. From that the system may determine that the malicious actor/communication is likely not associated with a competing company but, instead, someone involved in identify theft.

In the second mission 100', the malicious actor/communication 22 is presented with a vulnerability that identifies projects of a company. When exploited, the malicious actor/communication 22 is given access to vulnerabilities related to existing projects 122 and new projects 124. When the actor exploits the vulnerability associated with the new projects 124, the actor is given access to vulnerabilities associated with suppliers 126, manufacturing processes 128, and potential customers 130. When the actor accesses the vulnerability associated with manufacturing processes 128, the analysis server determines that the malicious actor/communication is primarily seeking company trade secrets and, specifically, new processes that the company is developing. Based on that, the system may determine that the malicious actor/communication is acting for a competitor.

The scores and other reports generated by triggered detection points may be collected and stored on an analysis server. The analysis server is capable of performing more sophisticated scoring beyond simple numeric calculations. For example, the scoring system can be utilized to evaluate an actor's skill at exploiting a specific type of vulnerability. The initial successful triggering of a detection point indicating exploitation of the vulnerability may result in a specific score being associated with the actor. However that score may be adjusted by the analysis server or program based on a number of other factors, such as the amount of time needed by the actor to identify the vulnerability and develop the exploit, the number of failed attempts to exploit the vulnerability, and the sophistication of the exploit that was used. Similarly, the scores could be adjusted based on comparison with scores associated with similar actors who have attempted to exploit the vulnerability. The analysis server or program implements the logic necessary to perform the adjusted scoring process as well as the comparative scoring.

The architecture of the mission process may also be used to perform an evaluation of the malicious actor/communication. Missions with multiple steps that allow actors to choose between various paths demonstrate preferences in approach that a malicious actor/communication is pre-disposed to follow. The choice may be further influenced by prior knowledge that an actor has collected. In the example in FIG. 6, the lower path (DP 1→DP 2b→DP 3) indicates access from the login screen using permitted usernames and passwords. The fact that the malicious actor/communication has a correct username and password indicates that other accounts (both fabricated or real) may have been compromised. The username and password used may provide an indication of where the compromise occurred. Additional detected information, such as common strings used by an actor, the tools used to test and exploit a vulnerability, the time between different attacks, and the time of day during which an actor is active, can each provide information that can be used to discern who the malicious actor is.

The evaluation process provides the opportunity to generate unique profiles for malicious actor/communications that may contain any of the evaluation criteria described above. This profiling process enables the ability to detect a given malicious actor/communication or team of actors regardless of the specific sources from which they launch their attacks. These profiles can be utilized to predict additional targets that the actor may launch attacks against, as well as the types of vulnerabilities they will be searching for. These predictions can in turn be used to generate additional missions tailored specifically to the actors in order to perform additional detection, manipulation, evaluation, and intelligence gathering.

As discussed above, the characterization of the malicious actor/communication can be used to dynamically adjust the mission by modifying the detection points (e.g., the complexity of the detection points) or by adding further detection points into the mission.

As discussed above, the evaluation of the malicious actor/communication or the attack can be used to detect the tools being used to infiltrate the system. With that knowledge, the present invention permits the owner of the system to modify the communications of the tool so as to essentially "break" its functionality if need be.

Distributed System Architecture

As described above, the system can be deployed in numerous configurations, enabling the interception and modification of communication for the purposes of attacker detection, manipulation, and evaluation. In addition, the architecture can be further decentralized to enable the deployment of the system across large networks, with reporting and configuration taking place in a hierarchical fashion.

This is accomplished through a distributed processing architecture that separates each component of the system's configuration, processing, and storage into parts that can operate independently.

FIG. 8 shows one preferred distribution of the operational components of the system. In this configuration, each component resides in a separate component, with a restricted set of communication paths between components. The Engine 200, which is responsible for implementing the matching and actions of the detection points, communicates with the Report Processor 210 via a simple push communication indicating the detection points that have been triggered. The Report Processor 210 verifies the source of the Engine's communication and the integrity of the message and, once verification is completed, writes the updated report into the Storage Database 220. The Storage Database 220 is responsible for recording the results of the reporting phases (e.g. scores, alerts, logs) which are displayed for administrators of the system via the Admin GUI 230. The Admin GUI 230 is also utilized for the creation of the detection points, which are then stored in the Storage Database 220. Detection points can also be retrieved from the Storage Database 220, converted into the format utilized by the Engine 200, and pushed out to the running Engine 200.

The system as depicted n FIG. 8 is particularly useful for distributing detection point files to the stored source. The configuration of the system also permits detection points and other capabilities (including new or improved functionality) to be modularly added to a system during runtime (i.e., as the system is operating) without the need to shut down the system, thereby extending the system's operations and capabilities. This also means that the system can be dynamically updated and modified, thereby tailoring the deployed program as needed and to only that what is required for the current operation.

As discussed above, one benefit of the present invention is the ability to dynamically change the detection points that a malicious actor/communication is presented based on the prior actions of the malicious actor/communication. That is, the system permits tailoring of the detection points to the particular capabilities, actions, or discerned information about the malicious actor/communication. In one embodiment, this dynamic creation of detection points is automatic. That is, the engine uses the results of the characterization of the malicious actor/communication to create new detection points that are places in the path of the malicious actor/communication (i.e., the malicious actor/communication Is exposed to the new detection points). In this way, the system can be seamlessly scaled for use in larger and/or diverse networks/computer systems (i.e., architected to scale). Reports or alerts can be generated (including depiction on a computer display or dashboard) when a malicious actor/communication performs an activity of interest (such as a malicious actor that is getting smarter or using new tools) or a new malicious actor/communication of interest has been detected that has not been tracked previously.

The illustrated implementation enables deployment of the system at large scales using various hierarchical configurations. For example, multiple Engines can report to a single Report Processor, multiple Report Processors can report to a single Storage Database and an individual Admin GUI can manage multiple Storage Databases.

Components of the detection and control system of the present invention may be stored on different computers and/or storage devices (e.g., mediums), and/or may be executed on different computers in a network. Also, as discussed above, the detection points can be placed at different levels for the network or system (e.g., in hardware, software, application, etc.) As used herein the term "computer system" encompasses a single server/harddrive, as well as multiple servers on a business network or enterprise computer platform. The method may be implemented through program code or program modules stored on a storage medium.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium, which may be in a physical form.

The system or systems described herein may be implemented on any form of computer or computers and the components may be implemented as dedicated applications or in client-server architectures, including a web-based architecture, and can include functional programs, codes, and code segments.

All references, including publications and web addresses cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The embodiments herein may be described in terms of functional block components and various processing steps. Such functional blocks may be realized by any number of hardware and/or software components that perform the specified functions. For example, the described embodiments may employ various integrated circuit components, e.g., memory elements, processing elements, logic elements, look-up tables, and the like, which may carry out a variety of functions under the control of one or more microprocessors or other control devices. Similarly, where the elements of the described embodiments are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the embodiments of the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. The use of the terms "a" and "an" and "the" and similar referents in the context of describing the invention (especially in the context of the following claims) should be construed to cover both the singular and the plural. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

The present invention may be embodied in other specific forms without departing from the spirit or essential attributes thereof and, accordingly, reference should be made to the appended claims, rather than to the foregoing specification, as indicating the scope of the invention.

What is claimed:

1. A method for detecting and manipulating a malicious actor/communication on a computer system, the method comprising the steps of:
   providing multiple detection points at specific locations in the computer system, each detection point presenting an opportunity to detect and manipulate a malicious actor/communication;
   detecting a malicious actor/communication on the system based on a triggering of a first detection point;
   controlling or manipulating the malicious actor/communication to a second detection point;
   characterizing the malicious actor/communication to determine some information about the malicious actor/communication based on an analysis of the activities or aspects of the malicious actor/communication detected by the triggering of one or more of the detection points;
   wherein there are multiple detection points provided in the system that are accessible from the first detection point; wherein the step of controlling or manipulating the malicious actor/communication comprises permitting the malicious actor/communication to access the multiple detection points that are accessible from the first detection point; and wherein the step of characterizing the malicious actor/communication involves determining an aspect of the malicious actor/communication based on which of the multiple detection points that are accessible from the first detection point are triggered by the malicious actor/communication.

2. A method according to claim 1, wherein the step of controlling or manipulating the malicious actor/communication involves modifying the content of the malicious actor/communication.

3. A method according to claim 1, wherein at least one of the multiple detection points is selected from at least one of the following: a program mistake in the code, hidden comments embedded in a web page, files in a file system, information on the system operation, a prescribed location, a potentially compromisable application, content that is adapted for use by a malicious actor in the attack, compromise, or disabling of computer systems, or the acquisition, destruction, or modification of information, and content that drives a certain activity that indicates that the communication is malicious, is from a malicious or unauthorized source, or has a malicious intent.

4. A method according to claim 1, wherein the step of characterizing involves one or more of: storing information related to the detection point that the malicious actor/communication is exploiting, detecting tools, programs or methods being used by the malicious actor/communication, and detecting what information about the system the malicious actor/communication is using to exploit the detection point.

5. A method according to claim 1, wherein the step of triggering of a detection point involves matching one or more features of the malicious actor/communication to a set of rules at a detection point, the features including one or more of: a source address where the communication was received from, a file being requested, a directory where a file requested resides, a time of day that a request is being made, a user making a request, a system where the request is made, and the contents be accessed.

6. A method according to claim 1, wherein step of manipulating the malicious actor/communication involves one or more of: adding content to the malicious actor/communication, modifying content in the malicious actor/communication, deleting content in the malicious actor/communication, redirecting the malicious actor/communication to a separate server where the malicious actor/communication is processed, and recording of the actions by the malicious actor/communication associated with the triggering of the detection point for use in future detecting of the malicious actor/communication.

7. A method according to claim 1, wherein step of manipulating the malicious actor/communication involves adding additional detection points based on the outcome of the characterization step.

8. A method according to claim 1, wherein the system further comprises the step of generating a report as a result of the triggering of a detection point.

9. A method for detecting and manipulating a malicious actor/communication on a computer system, the method comprising the steps of:
providing multiple detection points at specific locations in the computer system, each detection point presenting an opportunity to detect and manipulate a malicious actor/communication;
detecting a malicious actor/communication on the system based on a triggering of a first detection point;
controlling or manipulating the malicious actor/communication to a second detection point;
characterizing the malicious actor/communication to determine some information about the malicious actor/communication based on an analysis of the activities or aspects of the malicious actor/communication detected by the triggering of one or more of the detection points;
wherein some of the multiple detection points are arranged in the system in a sequence with one detection point leading to another detection point thereby defining a mission; and wherein the step of characterizing involves analyzing information related to the malicious actor/communication and its progression through the multiple detection points.

10. A method for detecting and manipulating a malicious actor/communication on a computer network or system, the method comprising the steps of:
creating multiple detection points for detecting, capturing or directing a malicious actor/communication;
implementing, integrating, or applying the multiple detection points to a target system or network;
intercepting a malicious actor/communication that is directed to the target system or network based on a triggering of a first detection point;
controlling or manipulating the malicious actor/communication to proceed to another detection point; and
characterizing the malicious actor/communication to determine some information about the malicious actor/communication based on an analysis of the activities or aspects of the malicious actor/communication that triggered at least one of the detection points;
wherein the step of controlling or manipulating the malicious actor/communication involves providing the malicious actor/communication with access to multiple detection points that are directly accessible from the first detection point; and
wherein the characterizing step involves analyzing which detection points were selected by the malicious actor/communication out of the multiple detection points, and determining an aspect of the malicious actor/communication based on that analysis.

11. A method according to claim 10, wherein the characterizing step involves analyzing the detection points that are triggered by the malicious actor/communication.

12. A method according to claim 10, wherein the characterizing step involves determining one or more of the following about the malicious actor/communication: what it is seeking, where it may have originated, how it accomplishes its malicious activities, the tools it is using, information used by the malicious actor/communication, and a relationship to other sources of malicious activity.

13. A method according to claim 10, wherein the controlling or manipulating step involves directing or altering the malicious actor/communication to prevent harm to the target system.

14. A method according to claim 13, wherein the malicious actor/communication is a malicious communication and wherein the step of altering of the malicious actor/communication involves modifying the malicious communication so it is no longer harmful to the target system, and wherein the malicious communication is sent to the target system after the modification.

15. A method according to claim 13, wherein the malicious actor/communication is a malicious communication and wherein the altering of the malicious actor/communication involves modifying the malicious communication to add a tag for tracking of and conducting later actions on the malicious communication.

16. A method according to claim 15, wherein the tag includes a data string added to the malicious communication's cookie header identifying a source as a malicious actor, and wherein the string stores a cookie in a web browser of the source which attaches information to later communications sent from that web browser.

17. A method according to claim 13, wherein the directing of the malicious actor/communication involves directing the malicious actor/communication to a vulnerability server that includes further detection points.

18. A method according to claim 10, wherein the controlling or manipulating step involves implementing further detection points into the system based on the characterization of the malicious actor/communication.

19. A method according to claim 10, wherein based on the second detection point triggered the controlling or manipulating step involves predicting future actions of the malicious actor/communication and modifying or adding detection points to the system to control or track the malicious actor/communication.

20. A method according to claim 10, wherein the step of creating one or more detection points includes leveraging actual data from the system or fake data incorporated into a part of the system that can be accessed by a malicious actor/communication, and wherein the step of characterizing the malicious actor/communication involves detecting when a malicious actor/communication uses the data in another part of the system and determining an aspect about the malicious actor/communication based on that detection.

21. A method according to claim 10, wherein the step of characterizing the malicious actor/communication involves storing information related to the malicious actor/communication for use in analyzing the malicious actor/communication.

22. A method according to claim 21, wherein the information stored is information related to the abilities of the malicious actor/communication to access a certain vulnerability in the system.

23. A method according to claim 10, wherein the detection point includes report rules which control generation of a report upon triggering of the detection point.

24. A method for detecting and manipulating a malicious actor/communication on a computer network or system, the method comprising the steps of:
    creating multiple detection points for detecting, capturing or directing a malicious actor/communication;
    implementing, integrating, or applying the multiple detection points to a target system or network;
    intercepting a malicious actor/communication that is directed to the target system or network based on a triggering of a first detection point;
    controlling or manipulating the malicious actor/communication to proceed to another detection point; and
    characterizing the malicious actor/communication to determine some information about the malicious actor/communication based on an analysis of the activities or aspects of the malicious actor/communication that triggered at least one of the detection points;
    wherein the step of implementing, integrating, or applying the one or more detection points involves creating a mission using multiple detection points, with each detection point leading to another detection point, the mission being indicative of certain information being sought by a malicious actor/communication.

25. A non-transitory computer usable medium having a computer readable program code embodied therein, the computer readable program code adapted to be executed to implement a method for detecting and manipulating a malicious actor/communication on a computer network or system, the method comprising the steps of:
    creating multiple detection points for detecting, capturing or directing a malicious actor/communication;
    implementing, integrating, or applying the detection points to a target system or network;
    intercepting a malicious actor/communication that is directed to the target system or network based on a triggering of a first detection point;
    controlling or manipulating the malicious actor/communication to a second detection point; and
    characterizing the malicious actor/communication to determine some information about the malicious actor/communication based on an analysis of the activities or aspects of the malicious actor/communication detected by the triggering of one or more of the detection points;
    wherein there are multiple detection points provided in the system that are accessible from the first detection point; wherein the step of controlling or manipulating the malicious actor/communication comprises permitting the malicious actor/communication to access the multiple detection points that are accessible from the first detection point; and wherein the step of characterizing the malicious actor/communication involves determining an aspect of the malicious actor/communication based on which of the multiple detection points that are accessible from the first detection point are triggered by the malicious actor/communication.

26. A protection system for detecting and manipulating a malicious actor/communication on a target computer program, the protection system comprising:
    a computer engine module configured to receive communications including malicious communications, the engine module including a first detection point and second detection points, each detection point including one or more match rules and actions to be accomplished upon a match being found, the engine module including program coding configured to compare the received communication against the match rules associated with the detection point to characterize the communication as a malicious communication, implement the actions associated with a detection point upon a determination that a communication matches the rules, and to control or manipulate the malicious communication;
    a report generator in communication with the engine module, the report generator adapted to generate a report upon a determination that a communication matches the rules;
    a storage database for receiving and storing detection points and reports; and
    an admin GUI module for creating detection points and sending the detection points to the engine module;
    wherein there are multiple second detection points provided in the system that are accessible from the first detection point; wherein controlling or manipulating the malicious actor/communication comprises detecting the triggering by the malicious actor/communication of the first detection point, and permitting the malicious actor/communication to access the multiple second detection points that are accessible from the first detection point; and wherein characterizing the malicious actor/communication involves determining an aspect of the malicious actor/communication based on which of the multiple second detection points that are accessible from the first detection point are triggered by the malicious actor/communication.

27. The protection system according to claim 26, wherein the engine module is configured as a proxy located between potential sources of malicious communications and the target program, the engine module configured such that malicious communications passes through the engine module before reaching the target program.

28. The protection system according to claim 26, wherein the engine module is located on a separate server from the target program.

\* \* \* \* \*